United States Patent [19]

Thylefors

[11] 3,749,458
[45] July 31, 1973

[54] CENTERING DEVICE FOR ROTARY SHAFT
[75] Inventor: Henric Wilhelm Thylefors, Stockholm, Sweden
[73] Assignee: Alfa-Laval AB, Tumba, Sweden
[22] Filed: Mar. 6, 1972
[21] Appl. No.: 232,169

[30] Foreign Application Priority Data
Mar. 15, 1971 Sweden.............................. 3273/71

[52] U.S. Cl. .............................................. 308/142
[51] Int. Cl. ............................................ F16c 23/04
[58] Field of Search ..................................... 308/142

[56] References Cited
FOREIGN PATENTS OR APPLICATIONS
500,691  2/1939  Great Britain...................... 308/143

*Primary Examiner*—Charles J. Myhre
*Assistant Examiner*—Frank Susko
*Attorney*—Cyrus S. Hapgood et al.

[57] ABSTRACT

The rotary shaft is journalled in a bearing housing associated with a machine frame provided with a stationary part engaging one of the inner and outer edges of a diaphragm having a central hole through which the shaft extends, the diaphragm being made of resilient material but being substantially rigid in its main plane. Said one edge of the diaphragm is slidable axially of the shaft relative to said stationary part while engaged by the latter, the other of said edges being rigidly connected to the bearing housing. Resilient means are provided through which said other edge of the diaphragm and the bearing housing are connected to the machine frame.

3 Claims, 2 Drawing Figures

PATENTED JUL 31 1973 3,749,458

CENTERING DEVICE FOR ROTARY SHAFT

The present invention relates to devices for centering a rotary shaft and of the type comprising a diaphragm of resilient material which is substantially rigid in its main plane and has a central hole through which the shaft extends, the inner or outer edge of the diaphragm lying against a stationary part of a machine frame and the other edge of the diaphragm being rigidly connected to a bearing housing in which the shaft is journalled and which is strongly loaded axially of the shaft. A centering device of this type is disclosed in British Pat. specifications Nos. 184,791 and 500,691. The strong load in the axial direction of the bearing housing is taken up by the diaphragm, which is a disadvantage from a strength point of view.

An object of the present invention is to completely unload the diaphragm in the axial direction. To this end, the first-mentioned diaphragm edge is arranged to slide axially relative to said part of the machine frame while lying rigidly thereagainst, and the other diaphragm edge is mounted by resilient means between the bearing housing and the stationary machine frame. The diaphragm material may be steel or a plastic reinforced with fibers. By arranging the resilient means to mount the diaphragm in the area of its outer edge, the radial extension of the centering device can be made relatively small.

Figure 1:
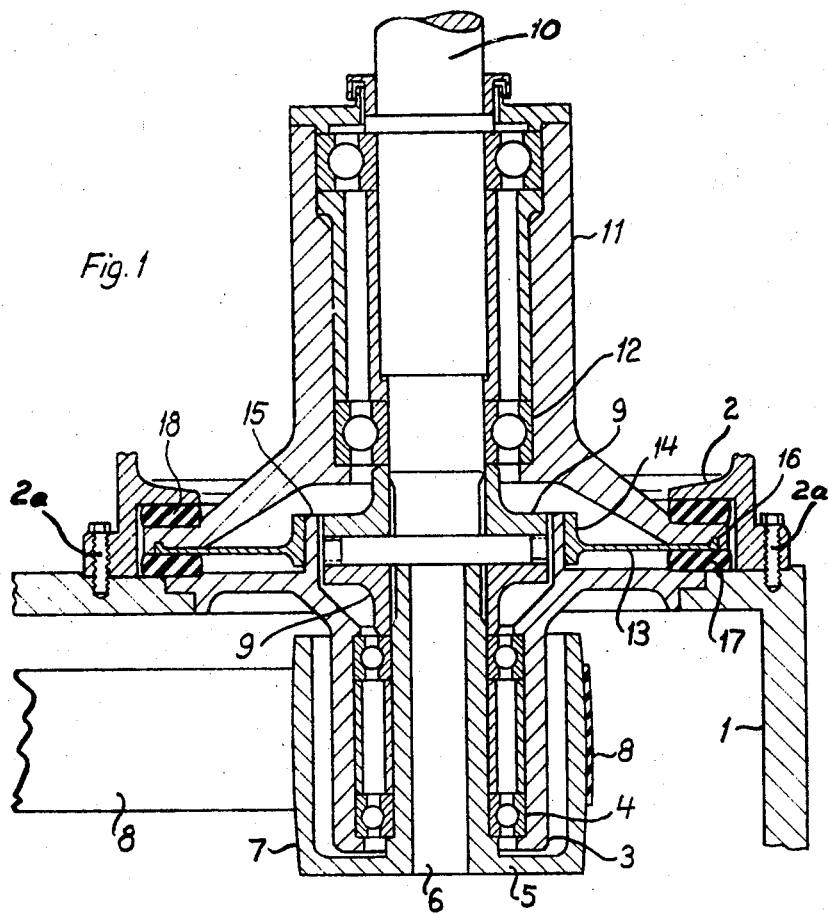
Figure 2:
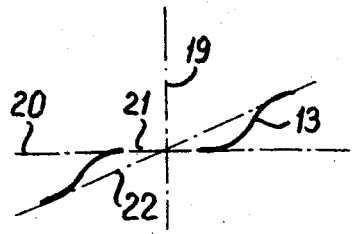

The invention is described more in detail below, reference being made to the accompanying drawing in which FIG. 1 is a vertical sectional view of an example of the present centering device, and FIG. 2 is a schematic illustration, on a reduced scale, of a deformation of the diaphragm according to FIG. 1 in an oscillatory deflection of the rotating shaft.

In FIG. 1 a stationary machine frame 1 is provided to which a housing 2 is secured by screws 2a. Mounted in the frame 1 is a bearing housing 3 carrying a bearing 4 in which a drive shaft 5 is journalled. This drive shaft has a central cavity 6 and an outer part 7 which constitutes a pulley, the drive belt being shown at 8. The shaft 5 drives, via a clutch coupling 9, a shaft 10 which is journalled in a bearing 12 carried by a bearing housing 11. The upper end of shaft 10 can carry a centrifuge rotor (not shown). A circular steel diaphragm 13 has a central hole containing the clutch coupling 9 and the edge of which is shaped as a cylinder 14. This cylindrical diaphragm edge lies rigidly against a stationary cylindrical part 15 of the machine frame's bearing housing 3 and is slidable axially on this part. The outer edge of the diaphragm has a thickening 16 fitted into a corresponding annular slot in the bearing housing 11, and the latter together with the diaphragm is kept resiliently clamped between the frame 1 and its housing part 2 by resilient means including a lower rubber ring 17 and an upper rubber ring 18.

In FIG. 2, the common axis of rotation of the shafts 5 and 10 is indicated at 19, the main plane of the diaphragm 13 is indicated at 20, and the central hole of the diaphragm is indicated at 21. The line 22 indicates the inclination of the base surface of the bearing housing 11 incident to an oscillatory deflection of the shaft 10, this inclination being exaggerated for the sake of illustration.

When screwing the housing 2 to the frame 1, the rubber rings 17 and 18 are compressed, and at the same time the diaphragm edge 14 slides downwardly somewhat along the cylindrical part 15 of the machine frame. When the shafts 5 and 10 stand still, the centering device takes the position shown in FIG. 1. When the shaft 10 has been brought into rotation, it has a tendency to make oscillatory deflections and causes a deformation of the diaphragm 13 in the manner illustrated in FIG. 2. Due to the substantial rigidity and resiliency of the diaphragm material, the diaphragm endeavors to return to the position shown in FIG. 1, whereby the oscillatory deflections of the shaft 10 are counter-acted and the desired damping of the oscillatory movements of the shaft 10 is obtained.

I claim:

1. In combination with a machine frame, a bearing housing associated with the frame, and a rotary shaft journalled in said bearing housing and loading said housing axially of the rotary shaft, a centering device for the rotary shaft comprising a diaphragm of resilient material having a main plane and a central hole into which said shaft extends, the diaphragm being substantially rigid in said main plane and having inner and outer edges, said frame having a stationary part engaging one of said edges and relative to which said one edge is slidable axially of the shaft, the other of said edges being rigidly connected to the bearing housing, and resilient means through which said other edge of the diaphragm and the bearing housing are connected to the machine frame.

2. The combination according to claim 1, in which said other edge is the outer edge of the diaphragm.

3. The combination according to claim 1, in which said frame part is an annular guide surrounding the shaft and closely surrounded by the inner edge of the diaphragm, said resilient means including elastic members clamping said outer edge and housing together on the machine frame.

* * * * *